(12) United States Patent
Chen et al.

(10) Patent No.: US 10,690,840 B2
(45) Date of Patent: Jun. 23, 2020

(54) BACKLIGHT MODULE THAT HAS A REDUCED THICKNESS COMPRISING AN OPTICAL ASSEMBLY AND DISPLAY DEVICE COMPRISING THE SAME

(71) Applicant: InnoLux Corporation, Miao-Li County (TW)

(72) Inventors: Chun-Fang Chen, Miao-Li County (TW); Hsin-Hung Chen, Miao-Li County (TW); Ying-Chia Fu, Miao-Li County (TW)

(73) Assignee: INNOLUX CORPORATION, Miao-Li County (TW)

(*) Notice: Subject to any disclaimer, the term of this patent is extended or adjusted under 35 U.S.C. 154(b) by 0 days.

(21) Appl. No.: 16/109,854

(22) Filed: Aug. 23, 2018

(65) Prior Publication Data
US 2019/0107666 A1 Apr. 11, 2019

(30) Foreign Application Priority Data
Oct. 11, 2017 (CN) .......................... 2017 1 0943991

(51) Int. Cl.
*F21V 8/00* (2006.01)
*G02F 1/1335* (2006.01)
*G02F 1/13357* (2006.01)

(52) U.S. Cl.
CPC .......... *G02B 6/0088* (2013.01); *G02B 6/009* (2013.01); *G02B 6/0055* (2013.01); *G02B 6/0083* (2013.01); *G02F 1/133605* (2013.01); *G02B 6/0068* (2013.01); *G02F 1/133606* (2013.01)

(58) Field of Classification Search
CPC .... G02B 6/0088; G02B 6/0055; G02B 6/009; G02F 1/133605; G02F 1/133606
See application file for complete search history.

(56) References Cited

U.S. PATENT DOCUMENTS

| | | | | |
|---|---|---|---|---|
| 2012/0092887 A1* | 4/2012 | Wu | .................... | G02F 1/133603 362/606 |
| 2013/0044278 A1* | 2/2013 | Kanemitsu | ........... | G02B 6/0051 349/64 |
| 2015/0355506 A1* | 12/2015 | Kim | ...................... | G02B 6/0073 362/607 |
| 2016/0150640 A1* | 5/2016 | Sugawara | ............ | H05K 1/0274 362/612 |
| 2016/0370527 A1* | 12/2016 | Chang | ................... | G02B 6/0088 |
| 2018/0335561 A1* | 11/2018 | Takase | .................. | F21V 29/503 |
| 2019/0250462 A1* | 8/2019 | Lin | .................... | G02F 1/133608 |

* cited by examiner

*Primary Examiner* — Tracie Y Green
(74) *Attorney, Agent, or Firm* — Bacon & Thomas, PLLC

(57) ABSTRACT

A backlight module includes an optical assembly, a plurality of first light units, and a light guide plate. The optical assembly includes a base film, a first conductive layer, and a first reflective layer. The first conductive layer is disposed on the base film, and the first reflective layer is disposed on the first conductive layer. The first reflective layer includes a first part and a second part. The first part is connected to the second part. The plurality of first light units are disposed on the first part and extend through the first part to be electrically connected to the first conductive layer. The light guide plate is disposed on the second part.

16 Claims, 8 Drawing Sheets

BACKLIGHT MODULE THAT HAS A REDUCED THICKNESS COMPRISING AN OPTICAL ASSEMBLY AND DISPLAY DEVICE COMPRISING THE SAME

CROSS REFERENCE TO RELATED APPLICATION

This application claims the benefits of the Chinese Patent Application Serial Number 201710943991.0, filed on Oct. 11, 2017, the subject matter of which is incorporated herein by reference.

BACKGROUND

1. Field

The present disclosure relates to a backlight module and a display device comprising the same. More particularly, it relates to a backlight module featuring for a specially designed optical assembly.

2. Description of Related Art

Owing to the progress of technology, electronic products are made smaller, lighter and more compact than ever. This is also true to backlight modules in modern display devices. A backlight module typically has a back plate, a lighting component, a light guide plate, and a reflective film. The backlight modules provide light to a display panel. In fact, the optical luminance of a backlight module has direct effects on the display quality of the display device using it.

To assemble a backlight module illustrated above, the conventional process is fixing the lighting component to the back plate, and then secures the light guide plate and the reflective film in specific position with tape, so as to allow light to pass through the light guide plate and the reflective film before being guided to the display panel. However, one issue unsolved in the prior art is that traditional manual assembling operation tends to cause inaccurate placement of these components and once the tape are not well performed, the resulting light may be yellowish, or in some cases, a gap existed between the light source and the light guide plate, leading to the optical luminance significantly reduced. Also, using of tape is adverse to the desire for thinness. When the reflective film is not well assembled, the display panel can have unexpected bright and/or dark regions, which effected the display quality.

Hence, there is a demand for producing a thin and good quality display device.

SUMMARY

In view of this, the present disclosure is to provide a backlight module with thinner thickness, or can be facilitated automated assembly to reduce human error during manual assembly.

To achieve the foregoing objective, the present disclosure provides a backlight module. The backlight module comprises an optical assembly, a plurality of first light units, and a light guide plate. The optical assembly comprises a base film, a first conductive layer, and a first reflective layer. The first conductive layer is disposed on the base film, and the first reflective layer is disposed on the first conductive layer. The first reflective layer includes a first part and a second part. The first part is connected to the second part. The plurality of first light units are disposed on the first part and extend through the first part to be electrically connected to the first conductive layer. The light guide plate is disposed on the second part.

The present disclosure further provides a display device, which comprises a display panel and a backlight module disposed correspondingly to the display panel. The backlight module comprises an optical assembly comprising a base film, a first conductive layer, and a first reflective layer. The first conductive layer is disposed on the base film, and the first reflective layer is disposed on the first conductive layer. The first reflective layer includes a first part and a second part. The first part is connected to the second part. The backlight module also comprises a plurality of first light units disposed on the first part and extending through the first part to be electrically connected to the first conductive layer. The backlight module further comprises a light guide plate disposed on the second part.

DETAILED DESCRIPTION

The present disclosure will be described with reference to some other embodiments and it is understood that the embodiments are not intended to limit the scope of the present disclosure. Moreover, as the contents disclosed herein should be readily understood and can be implemented by a person skilled in the art, all equivalent changes or modifications which do not depart from the concept of the present disclosure should be encompassed by the appended claims.

In the specification and the appended claims, the ordinal numbers like "first" and "second" are just descriptive to the elements following them and do not mean or signify that the claimed elements are such numbered, that one claimed element is arranged with another claimed element in that order, and that the claimed elements are produced in that order. These ordinal numbers are only used to help differentiate one claimed element having a denomination from another claimed element having the same denomination.

Additionally, in the specification and the appended claims, where a location is described as "above", "on", "over", "below", "under" or "beneath," elements connected by such a term may be in direct contact, or may be not in direct contact.

Furthermore, the features of the embodiments of the present disclosure as described below may be used in any combination to form additional embodiments.

Figure 1A:
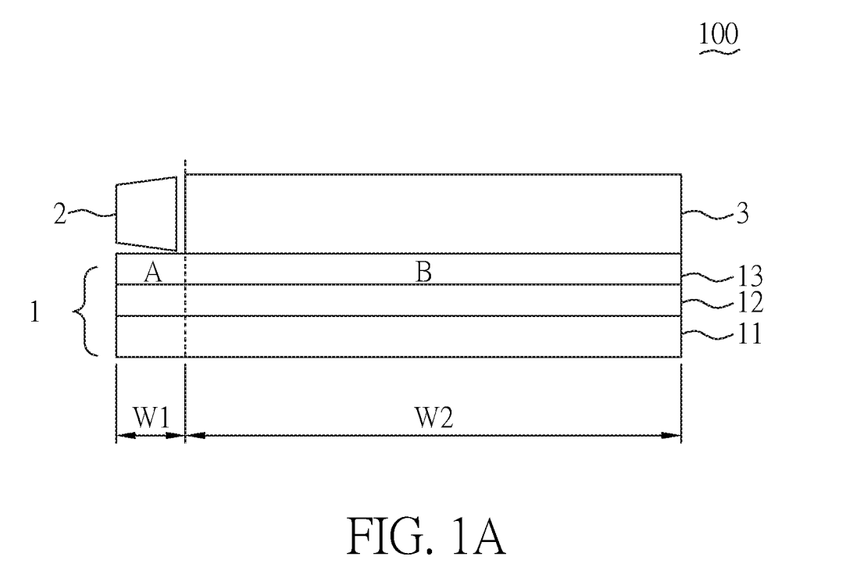
FIG. 1A is a cross-sectional view of an edge-type backlight module according to one embodiment of the present disclosure.

Please refer to FIG. 1A. FIG. 1A is a cross-sectional view of a backlight module according to one embodiment of the present disclosure. The backlight module comprises an optical assembly 1, which comprises a base film 11, a first conductive layer 12, and a first reflective layer 13. The first conductive layer 12 is disposed on the base film 11, and the first reflective layer 13 is disposed on the first conductive layer 12. The first reflective layer 13 includes a first part A and a second part B, and the first part A is connected to the second part B. The backlight module also comprises a plurality of first light units 2 disposed on the first part A. The plurality of first light units 2 extend through the first part A to be electrically connected to the first conductive layer 12. The backlight module further comprises a light guide plate 3 disposed on the second part B.

Herein, while it is not shown, the plurality of first light units 2 may extend through the first part A by way of leading wires or vias to be electrically connected to the first conductive layer 12.

The conventional manual operation for assembling a backlight module is likely to cause inaccurate alignment leading to decreased yield of the resulting display devices. In the backlight module of the present embodiment, the first reflective layer 13 and the first conductive layer 12 may be formed as a unity. More particularly, the optical assembly 1 may further comprise an adhesive layer (not shown) disposed between the first conductive layer 12 and the first reflective layer 13. The adhesive layer binds the first conductive layer 12 and the first reflective layer 13 together to form a unity. Alternatively, the first reflective layer 13 may be coated on the first conductive layer 12, to be integrated to form a combination of the first conductive layer 12 and the first reflective layer 13. Since the backlight module of the present embodiment has its first reflective layer 13 and first conductive layer 12 formed as a unity, there is no need to manually assemble light components and reflective film, thereby ensuring good product yield. Also, different from the traditional backlight module that is made by manual assembling light components, reflective film and tape, the disclosed backlight module has its first reflective layer 13 and first conductive layer 12 to be integrated to be formed, so overall thickness of the optical assembly 1 can be significantly reduced.

FIG. 1A shows a backlight module that is an edge-type backlight module. Therein, the plurality of first light units 2 are placed by the light guide plate 3. The plurality of first light units 2 are arranged along a first direction x (see FIG. 6A). The first part A has a first width W1 in a second direction y perpendicular to the first direction x, and the second part B has a second width W2 in the second direction y perpendicular to the first direction x. The sizes of the first width W1 and the second width W2 are not limited in the present disclosure and may be set according to the size of the resulting display device. For example, a ratio of the first width W1 to the second width W2 may be in a range between 0.014 and 0.083. In one embodiment of the present disclosure, the width W1 of the first part A may be 3-5 μm, and the width W2 of the second part B may be 60-220 μm.

The base film 11 may be made of any substrate material or insulating material, such as polyimide (PI), polyethylene terephthalate (PET), polymethylmethacrylate (PMMA) and so on, and the present disclosure places no limitation thereto. In addition, the thickness of the base film 11 is not limited by the present disclosure and may be set according to the size of the resulting display device. For example, the thickness of the base film 11 may be 5 μm-30 μm, while the present disclosure places no limitation thereto.

The first reflective layer 13 may be made of any material that endures 245-260° C. and reflects light to the display panel, such as any one or more selected from the group consisting of polyimide, white ink, and resin. The optical assembly 1 preferably has a reflectivity in a range between 20% and 99.99%, such as 90% and 99.99%, while the present disclosure places no limitation thereto. In addition, the first reflective layer 13 has a thickness in a range between 5 μm and 50 μm. Moreover, the first reflective layer 13 may have a single-layer structure or a multi-layer structure.

In one embodiment of the present disclosure, the first reflective layer 13 may be made of white ink. In this case, the first reflective layer 13 made of white ink may have a thickness in a range between 5 μm and 30 μm. In another embodiment of the present disclosure, the optical assembly 1 may further comprise an adhesive layer (not shown), and the first reflective layer 13 may be made of white polyimide. In this case, adhesive layer may have a thickness in a range between 5 μm and 30 μm, and the white polyimide layer may have a thickness may in a range between 5 μm and 30 μm. In still another embodiment of the present disclosure, the optical assembly 1 may further comprise an adhesive layer (not shown), and where the polyimide is not white (e.g., yellow polyimide), the first reflective layer 13 may have a double-layer structure, wherein the lower layer (the layer that is closer to the first conductive layer 12) is made of non-white polyimide and adhered to the first conductive layer 12 by means of the adhesive layer, while the upper layer is made of white ink. In this case, the adhesive layer may have a thickness in a range between 5 μm and 30 μm, and the white polyimide layer may have a thickness in a range between 5 μm and 30 μm, while the white ink layer may have a thickness in a range between 5 μm and 30 μm. The adhesive layer described in the foregoing embodiment may be omitted according to the practical design. The present disclosure places no limitation thereto.

The first conductive layer 12 may be made of any material that is electrically conductive, such as metal. In one embodiment of the present disclosure, the first conductive layer 12 is made of copper. Therein, the first conductive layer 12 corresponding to the second part B of the first reflective layer 13 may be a planar conductive layer or a patterned conductive layer. In the present embodiment, the first conductive layer 12 may have a thickness in a range between 1 μm and 30 μm, such as 5 μm. In another embodiment, the first conductive layer 12 may have a thickness in a range between 3 μm and 15 μm. The present disclosure places no limitation thereto. In one embodiment of the present disclosure, the first conductive layer 12 comprises a circuit part and a patterned part. The circuit part is positionally corresponding to the first part A of the first reflective layer 13, and the patterned part is positionally corresponding to the second part B of the first reflective layer 13. The patterned part of the first conductive layer 12 may be a metal patterned structure. The patterned part of the first conductive layer 12 may has a mesh structure which is a repeating structure with repeating units, and the repeating units can have a rectangle, round, irregular shape or combination thereof. However, the present disclosure is not limited thereto. Where the first conductive layer 12 corresponding to the second part B of the first reflective layer 13 is a patterned conductive layer, it can not only provide a supporting force but also ensure toughness, evenness and flexibility at the region corresponding to the second part B of first reflective layer 13. The conductive layer is patterned to reduce excessively high rigidity that may bend or damage the reflective layer and in turn lead to optical defects of the resulting display (such as bright lines, or bright points). In the present embodiment, first conductive layer 12 functions as not only an electrical conductor but also a support. Since the first conductive layer 12 can play a role as a back plate at the same time, the backlight module of the present embodiment can omit the use of a back plate 8 as shown in FIG. 6B, and this helps to further reduce the thickness of the resulting display device.

In the present embodiment, the plurality of first light units 2 may be light-emitting diodes or cold cathode fluorescent lamps.

Figure 1B:
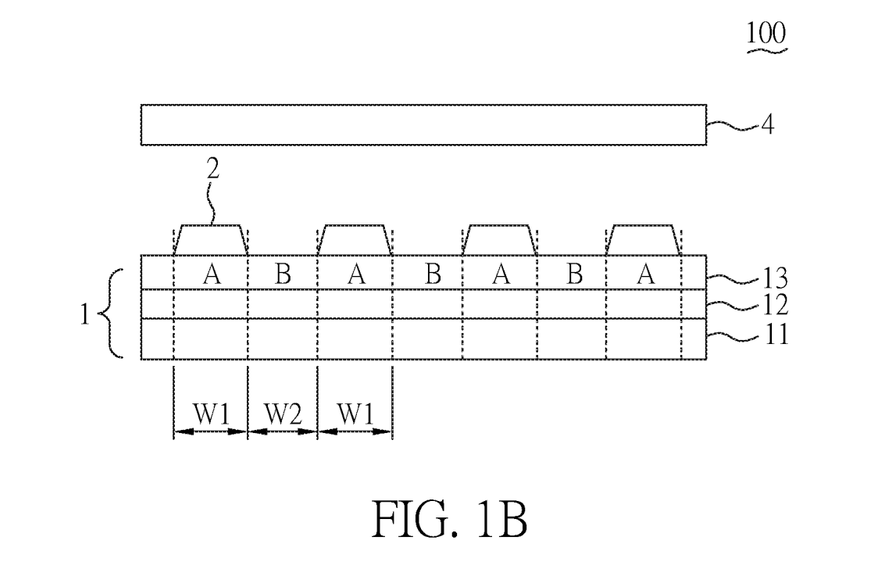
FIG. 1B is a cross-sectional view of a direct-type backlight module according to one embodiment of the present disclosure.

FIG. 1B is a cross-sectional view of a direct-type backlight module according to another embodiment of the present disclosure. The backlight module of FIG. 1B is similar to its counterpart in FIG. 1A with the difference that the backlight module of FIG. 1B is a direct-type backlight module comprising an optical assembly 1, a plurality of first light units 2 and a diffuser plate 4. The optical assembly 1 comprises a base film 11, a first conductive layer 12, and a first reflective layer 13. The first conductive layer 12 is disposed on the base film 11 and the first reflective layer 13 is disposed on the first conductive layer 12. Therein, the first reflective layer 13 includes a first part A and a second part B. The first part A is connected to the second part B. The plurality of first light units 2 are disposed on the first part A and extend through the first part A to be electrically connected to the first conductive layer 12. The diffuser plate 4 is disposed on the second part B. Therein, the plurality of first light units 2 are disposed between the first reflective layer 13 and the diffuser plate 4. The plurality of first light units 2 are arranged along a first direction x (see FIG. 7A). The first part A has a first width W1 in the second direction y perpendicular to the first direction x, and the second part B has a second width W2 in the second direction y perpendicular to the first direction x. The sizes of the first width and the second width W2 are not limited in the present disclosure and may be set according to the size of the resulting display device. For example, a ratio of the first width W1 to the second width W2 may be in a range between 0.25 and 0.67. In one embodiment of the present disclosure, the width W1 of the first part A may be 20 μm, and the width W2 of the second part B may be 30-80 μm.

Therein, the materials used to make the base film 11, first conductive layer 12, first reflective layer 13, and plurality of first light units 2 of the present embodiment are identical to those described with reference to FIG. 1A, and are not repeated herein. Since the first conductive layer 12 can play a role as a back plate at the same time, the backlight module of the present embodiment can omit the use of a back plate 8 as shown in FIG. 7B, and this helps to further reduce the thickness of the resulting display device.

FIG. 2A through FIG. 5 depict an edge-type backlight module as an example to further explain the detailed structure of the backlight module of the present disclosure. However, the present disclosure is not limited thereto, and all variations may be applied to a direct-type backlight module as shown in FIG. 1B, so the repeated description is omitted herein.

Figure 2A:
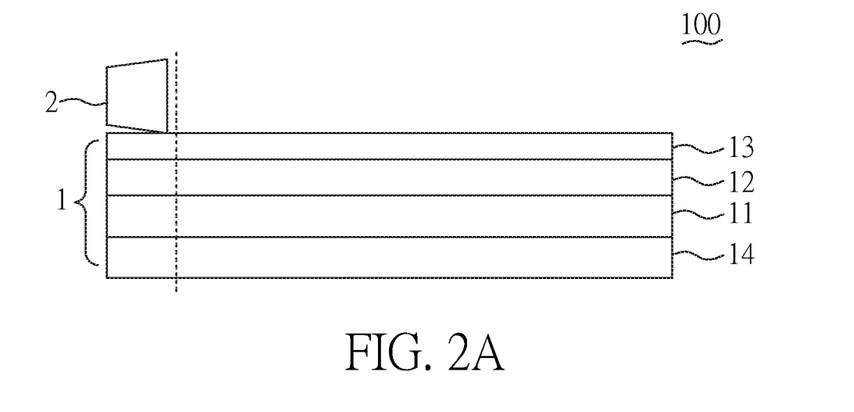
FIG. 2A is a partial cross-sectional view of a backlight module according to one embodiment of the present disclosure.
Figure 2B:
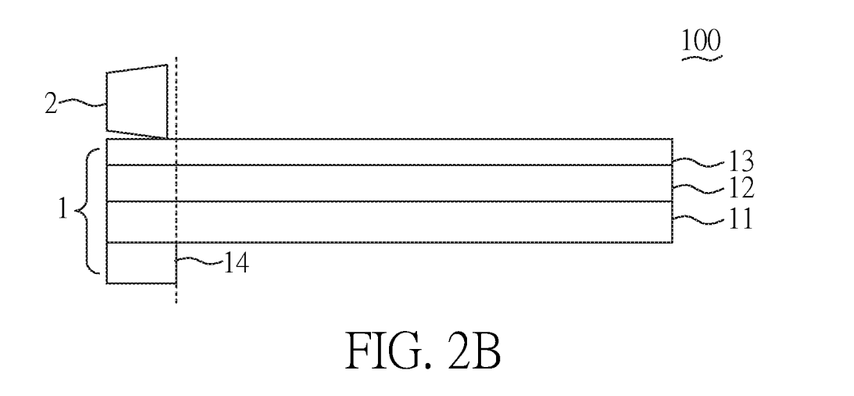
FIG. 2B is a partial cross-sectional view of a backlight module according to another embodiment of the present disclosure.

The backlight module shown in FIG. 2A and FIG. 2B is similar to its counterpart of FIG. 1A. As can be seen in FIGS. 2A and 2B, the optical assembly 1 of the present disclosure may further comprise a second conductive layer 14, and the base film 11 is located between the first conductive layer 12 and the second conductive layer 14. Therein, the second conductive layer 14 may be positionally corresponding to the first part A of the first reflective layer 13 (FIG. 2B), or the second conductive layer 14 may be corresponding to the first part A and the second part B of the first reflective layer 13 (FIG. 2A). The second conductive layer 14 may be made of any material that is electrically conductive, such as metal. In one embodiment of the present disclosure, the second conductive layer 14 is made of copper. Furthermore, the second conductive layer 14 and the first conductive layer 12 may be made of the same material or different materials. Additionally, the second conductive layer 14 may have a thickness in a range between 1 μm and 30 μm, such as 12 μm. In another embodiment, the second conductive layer 14 may have a thickness in a range between 3 μm and 15 μm. However, in this regard, the present disclosure places no limitation thereon.

Figure 3:
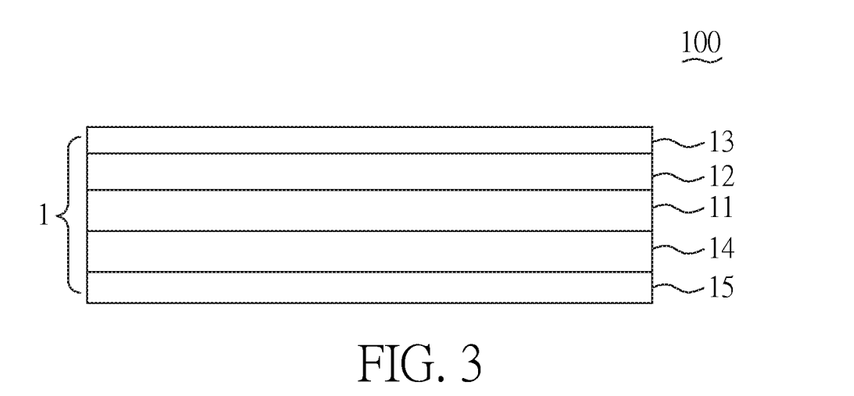
FIG. 3 is a partial cross-sectional view of a backlight module according to another embodiment of the present disclosure.

The backlight module of FIG. 3 is similar to its counterpart in FIG. 2A. However, the optical assembly 1 of FIG. 3 further comprises a protective layer 15 for protecting the second conductive layer 14, and the second conductive layer 14 is located between the base film 11 and the protective layer 15. The protective layer 15 is made of insulating material, such as polyimide. Additionally, the protective layer 15 may be selectively adhered to the second conductive layer 14 by means of an adhesive layer.

Figure 4A:
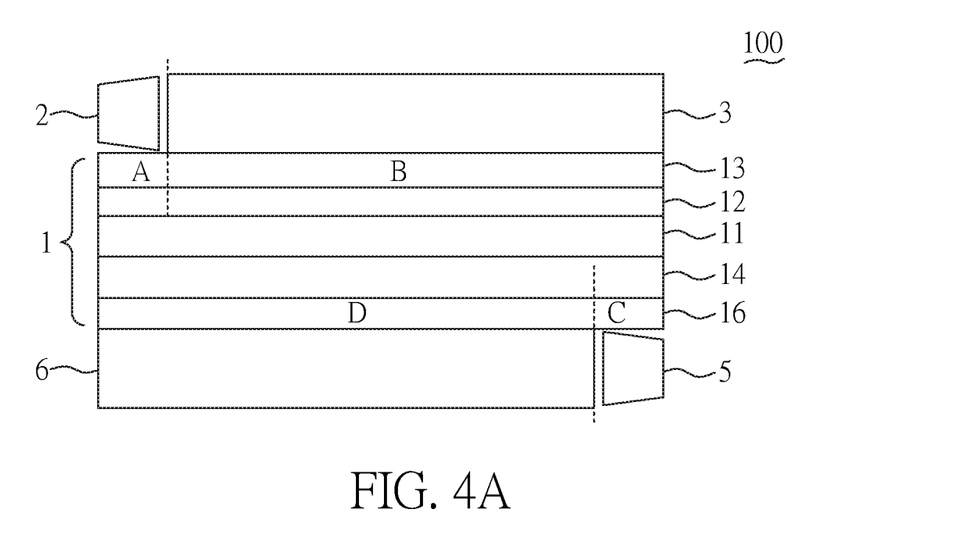
FIG. 4A is a partial cross-sectional view of a backlight module of a double-sided display device according to one embodiment of the present disclosure.
Figure 4B:
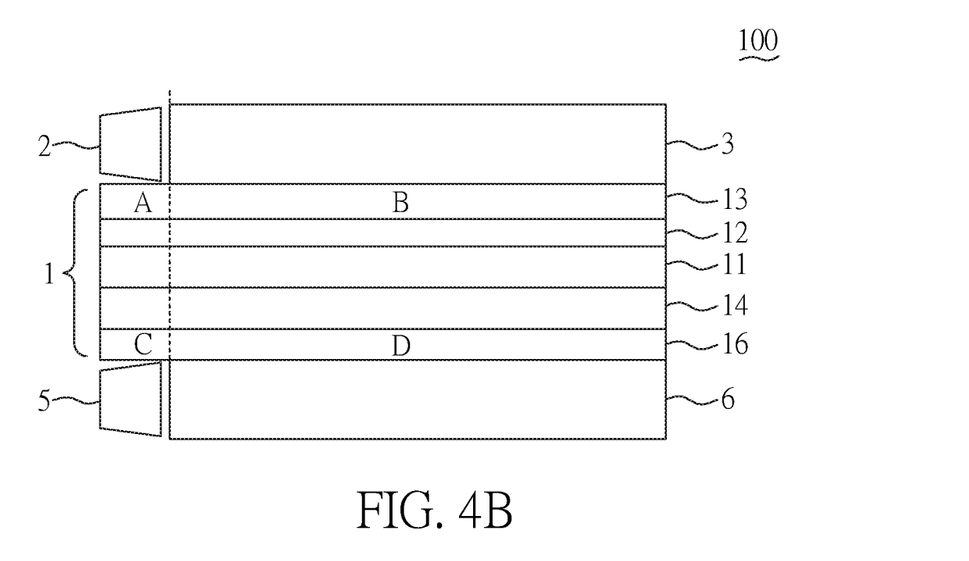
FIG. 4B is a partial cross-sectional view of a backlight module of a double-sided display device according to another embodiment of the present disclosure.

FIGS. 4A and 4B are partial cross-sectional views of backlight modules for double-sided display devices. Therein, the backlight module comprises a first optical assembly 1, a plurality of first light units 2, a plurality of second light units 5, a first light guide plate 3, and a second light guide plate 6. The first optical assembly 1 comprises a base film 11, a first conductive layer 12, a first reflective layer 13, a second conductive layer 14, and a second reflective layer 16. The first conductive layer 12 is disposed on the base film 11, and the first reflective layer 13 is disposed on the first conductive layer 12. The first conductive layer 12 and the second conductive layer 14 are at two opposite sides of the base film 11, and the second conductive layer 14 is disposed between the base film 11 and the second reflective layer 16. Therein, the first reflective layer 13 includes a first part A and a second part B, and the first part A is connected to the second part B. The second reflective layer 16 includes a third part C and a fourth part D, and the third part C is connected to the fourth part D. The plurality of first light units 2 are disposed on the first part A and extend through the first part A to be electrically connected to the first conductive layer 12. The plurality of second light units 5 are disposed below the third part C and extend through the third part C to be electrically connected to the second conductive layer 16. The first light guide plate 3 is disposed on the second part B. The second light guide plate 6 is disposed below the fourth part D.

Referring to FIGS. 4A and 4B, the third part C of the second reflective layer 16 may be positionally corresponding to the second part B of the first reflective layer 13 (FIG. 4A), or the third part C of the second reflective layer 16 may be positionally corresponding to the first part A of the first reflective layer 13 (FIG. 4B). While not shown herein, the plurality of first light units 2 may extend through the first part A of the first reflective layer 13 by way of leading wires or vias to be electrically connected to the first conductive layer 12. Similarly, the plurality of second light units 5 may extend through the third part C of the second reflective layer 16 by way of leading wires or vias to be electrically connected to the second conductive layer 14.

Therein, the second conductive layer 14 corresponding to the fourth part D of the second reflective layer 16 may be a planar conductive layer or a patterned conductive layer. The second conductive layer 14 may be made of any material that is electrically conductive, such as metal. The second conductive layer 14 and the first conductive layer 12 may be made of the same material or different materials. In one embodiment of the present disclosure, the second conductive layer 14 is made of copper, while the present disclosure is not limited thereto. The second conductive layer 14 of the present embodiment may have a thickness in a range between 1 µm and 30 µm, such as 12 µm. In another embodiment, the second conductive layer 14 may have a thickness in a range between 3 µm and 15 µm, while the present disclosure is not limited thereto. In one embodiment of the present disclosure, the second conductive layer 14 comprises a circuit part and a patterned part. The circuit part is corresponding to the third part C of the second reflective layer 16, and the patterned part is corresponding to the fourth part D of the second reflective layer 16. The patterned part of the second conductive layer 14 may be a metal patterned structure. The patterned part of the second conductive layer 14 has a mesh structure which is a repeating structure with repeating units, and the repeating units can have a rectangle, round, irregular shape or combination thereof. However, the present disclosure is not limited thereto.

Figure 5:
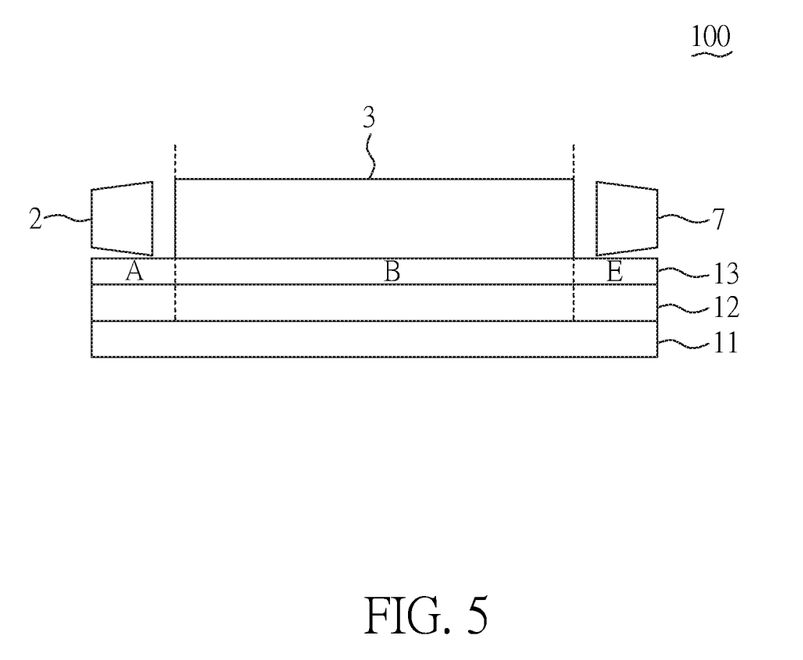
FIG. 5 is a partial cross-sectional view of an edge-type multi-light-strip backlight module according to one embodiment of the present disclosure.

FIG. 5 is a partial cross-sectional view of an edge-type multi-light-strip backlight module. The backlight module is similar to its counterpart of FIG. 1A and comprises an optical assembly 1, a plurality of first light units 2, a plurality of second light units 7, and a light guide plate 3. The optical assembly 1 comprises a base film 11, a first conductive layer 12, and a first reflective layer 13. The first conductive layer 12 is disposed on the base film 11, and the first reflective layer 13 is disposed on the first conductive layer 12. The first reflective layer 13 includes a first part A, a second part B, and a third part E. The second part B is located between the first part A and the third part E. The plurality of first light units 2 are disposed on the first part A and extend through the first part A to be electrically connected to the first conductive layer 12. The plurality of second light units 7 are disposed on the third part E and extend through the third part E to be electrically connected to the first conductive layer 12. The light guide plate 3 is disposed on the second part B.

While not shown, the plurality of first light units 2 may extend through the first part A by way of leading wires or vias to be electrically connected to the first conductive layer 12. Similarly, the plurality of second light units 7 may also extend through the third part E by way of leading wires or vias to be electrically connected to the first conductive layer 12.

Figure 6A:
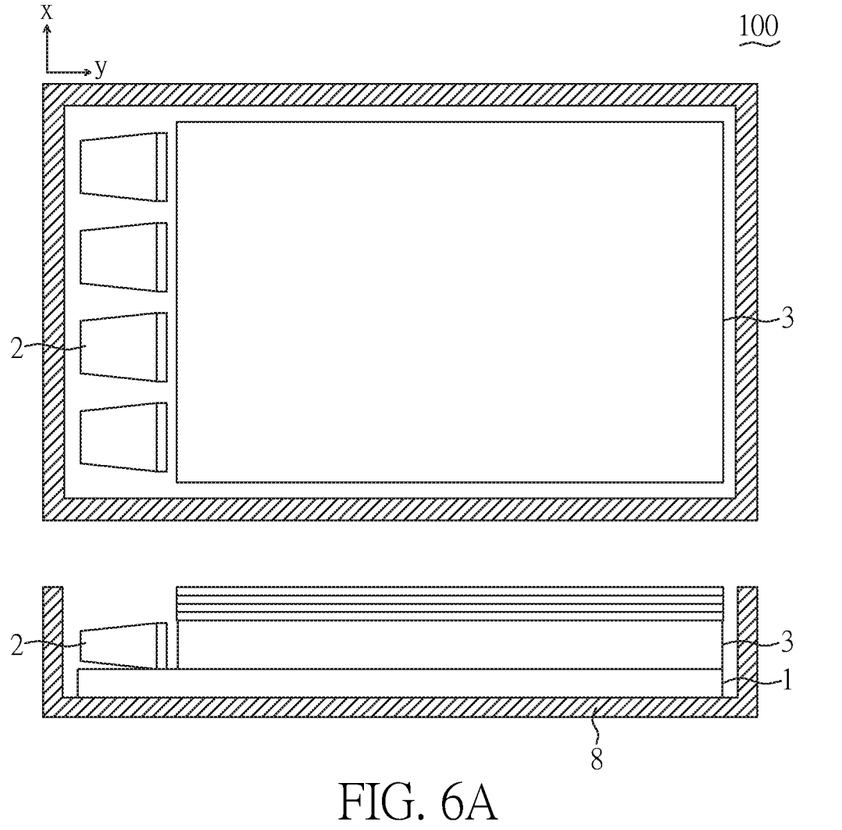
FIG. 6A shows a top view and a cross-sectional view of an edge-type backlight module according to one embodiment of the present disclosure.
Figure 6B:
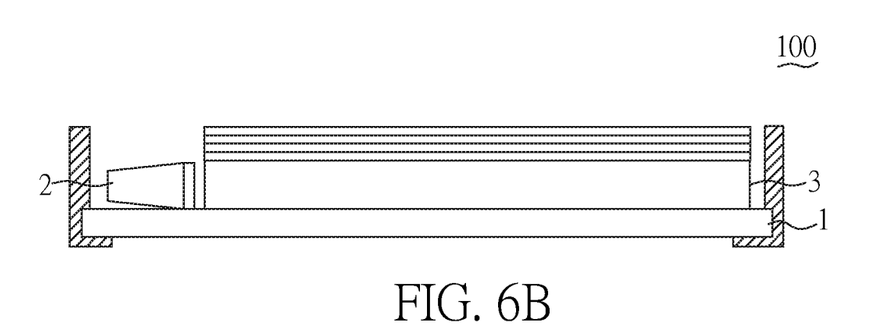
FIG. 6B is a cross-sectional view of an edge-type backlight module according to another embodiment of the present disclosure.

FIG. 6A shows a top view and a cross-sectional view of a part of an edge-type backlight module. Therein, the optical assembly 1 may be structurally identical to its counterpart shown in FIG. 1A, or the optical assembly 1 shown in FIGS. 2A and 3. FIG. 6B is a partial cross-sectional view of an edge-type part backlight module according to another embodiment. Therein, the backlight module of FIG. 6B is similar to its counterpart shown in FIG. 6A with the difference that the first conductive layer 12 also acts as a back plate, so the backlight module of the present embodiment can omit the use of a back plate 8.

Figure 7A:
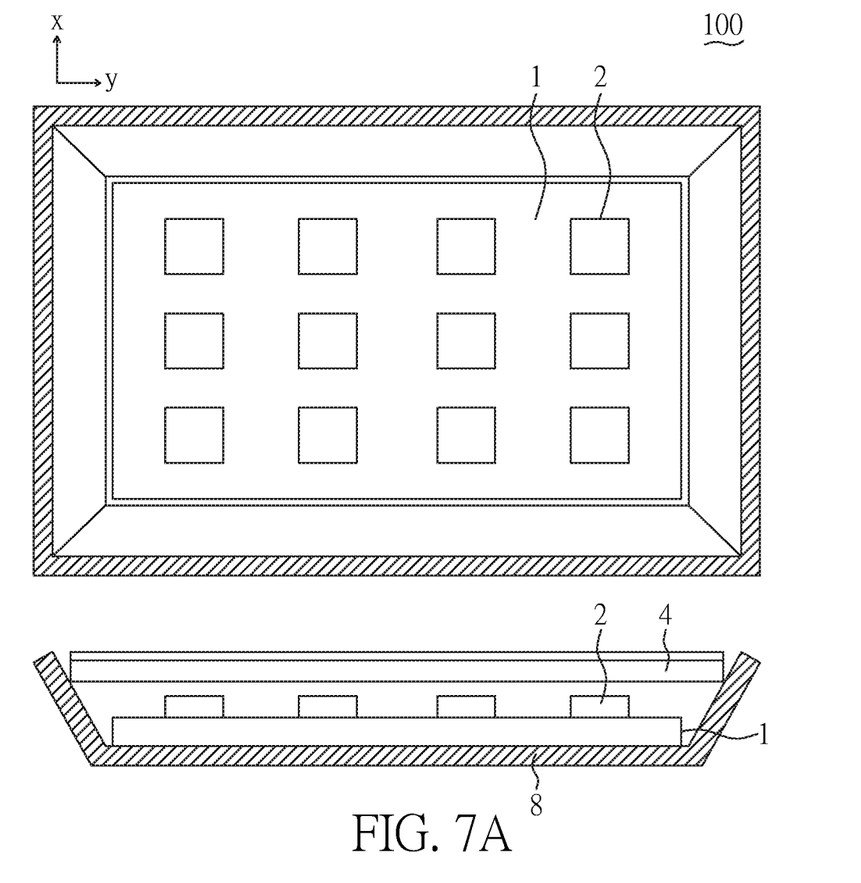
FIG. 7A shows a top view and a cross-sectional view of a direct-type backlight module according to one embodiment of the present disclosure.
Figure 7B:
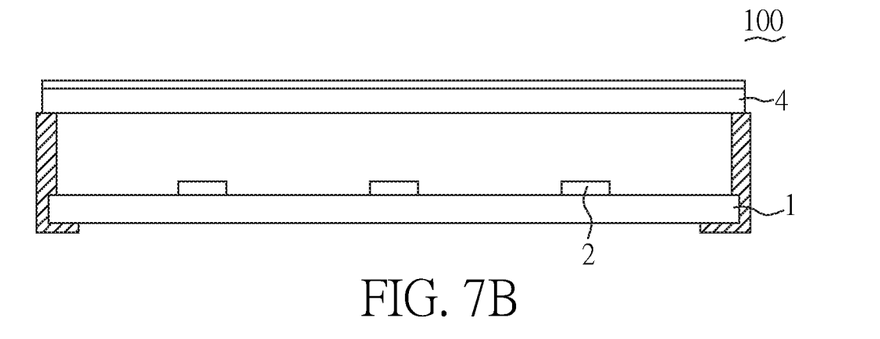
FIG. 7B is a cross-sectional view of a direct-type backlight module according to another embodiment of the present disclosure.

FIG. 7A shows a top view and a cross-sectional view of a direct backlight module. Therein, optical assembly 1 may be structurally identical to its counterpart shown in FIG. 1B, or it may be similar to an edge-type backlight module to the possible maximum extent. FIG. 7B is a cross-sectional view of another direct part backlight module. The backlight module of FIG. 7B is similar to its counterpart of FIG. 7A with the difference that the first conductive layer 12 also acts as a back plate, so the backlight module of the present embodiment can omit the use of a back plate 8.

Figure 8:
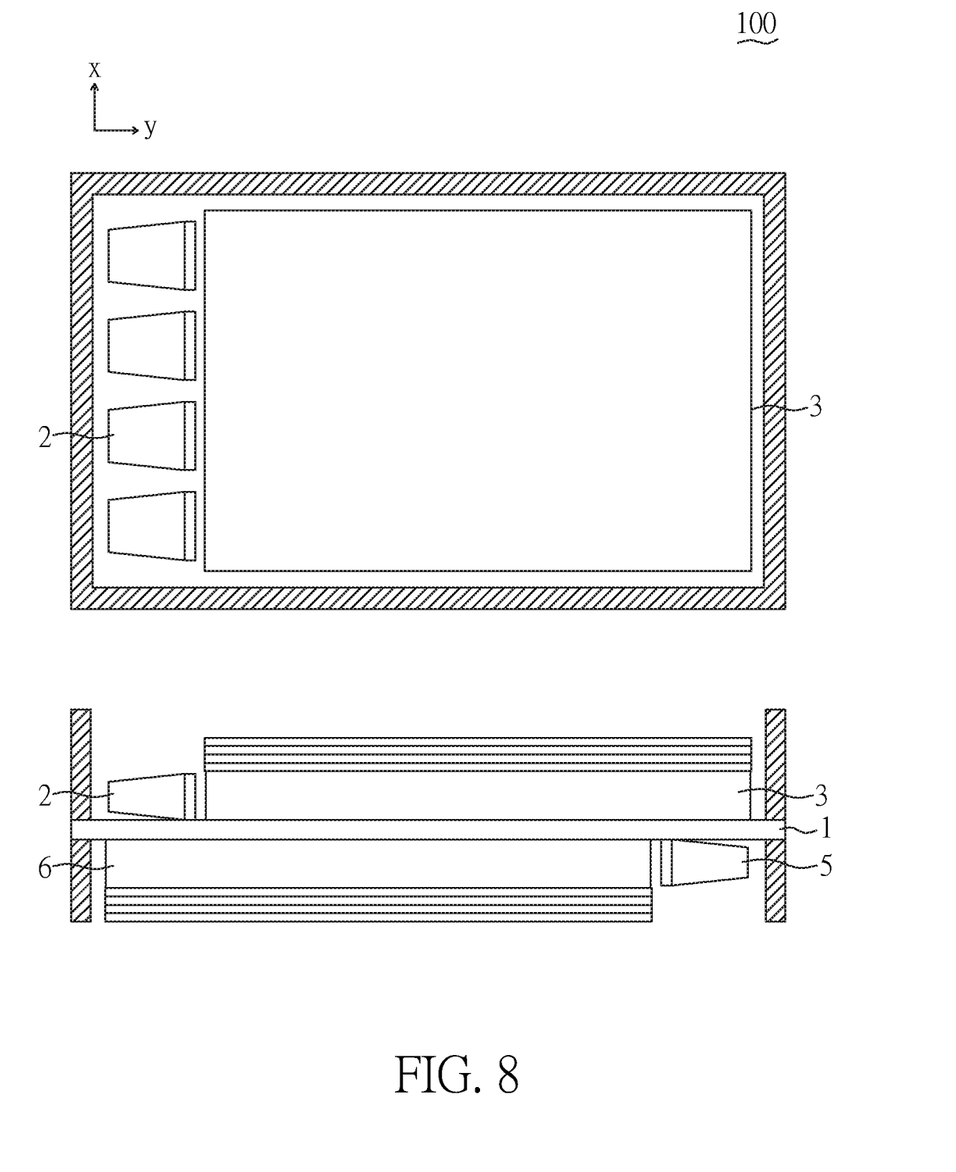
FIG. 8 shows a top view and a cross-sectional view of a backlight module of an edge-type double-sided display device according to one embodiment of the present disclosure.

FIG. 8 shows a top view and a cross-sectional view of a backlight module for a double-sided display device. Therein, optical assembly may be structurally identical to its counterpart shown in FIG. 4A. The first part A of the first reflective layer 13 may be corresponding to the fourth part D of the second reflective layer 16, and the third part C of the second reflective layer 16 may be corresponding to the second part B of the first reflective layer 13. Alternatively, the optical assembly 1 may be structurally identical to its counterpart shown in FIG. 4B. The first part A of the first reflective layer 13 may be corresponding to the third part C of the second reflective layer 16, and the second part B of the first reflective layer 13 may be corresponding to the fourth part D of the second reflective layer 16, while the plurality of first light units 2 and the plurality of second light units 5 are disposed in the first part A and the third part C, respectively.

Figure 9:
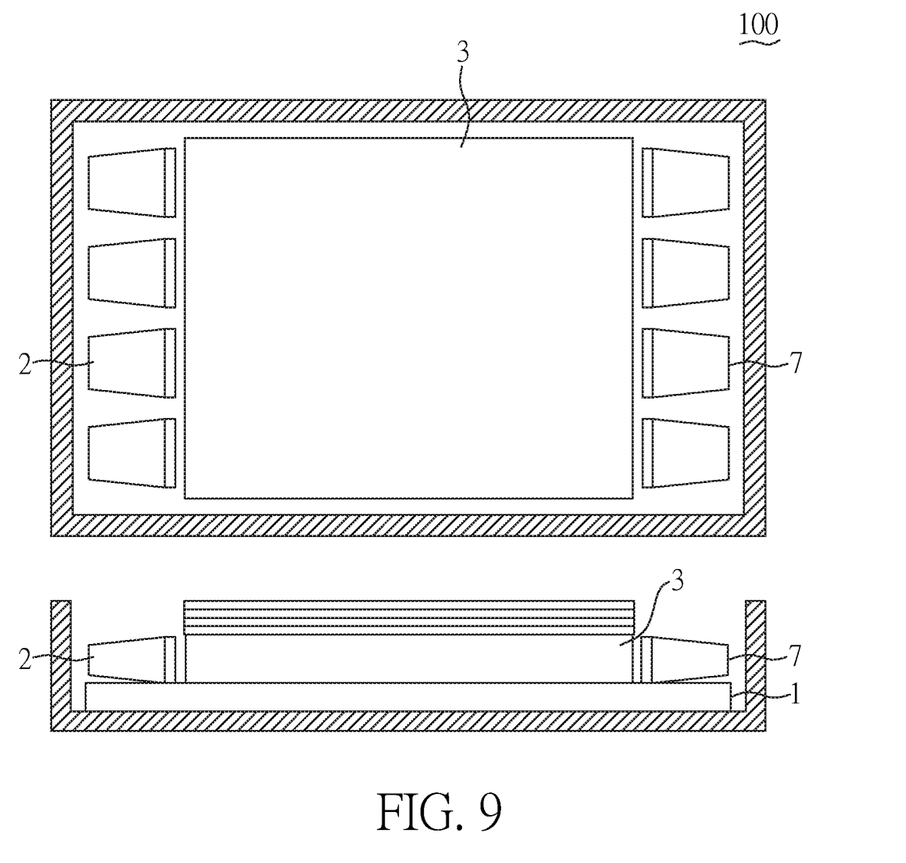
FIG. 9 shows a top view and a cross-sectional view of an edge-type multi-light-strip backlight module according to one embodiment of the present disclosure.

FIG. 9 shows a top view and across-sectional view of an edge-type multi-light-strip backlight module. Therein, the optical assembly 1 may be structurally identical to its counterpart shown in FIG. 5. The light guide plate 3 is disposed between the plurality of first light units 2 and the plurality of second light units 7.

Figure 10:
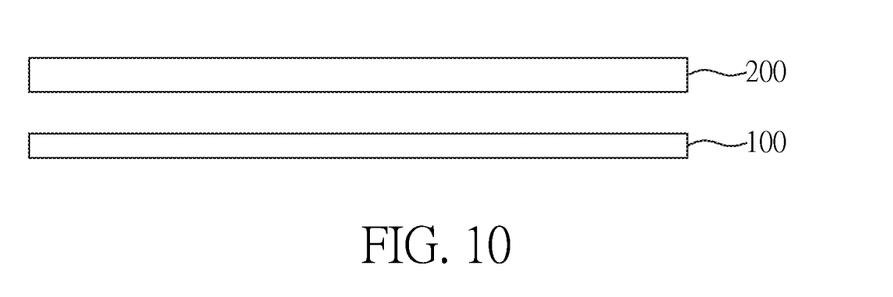
FIG. 10 is a cross-sectional view of a display device according to one embodiment of the present disclosure.

FIG. 10 is a display device of the present disclosure. It comprises a display panel 200 and a backlight module 100 corresponding to the display panel 200. The backlight module 100 is as that depicted from FIG. 1A to FIG. 9. In the present embodiment, the display panel 200 may be a display panel that needs backlight, such as a liquid crystal display panel, flexible display panel, or tiled display device.

To sum up, in the display device of the present disclosure, the backlight module is thinned and may be made using an automated assembling process or its assembling operation can at least decreasing defects seen in the conventional manual assembling operation such as poor adhesion, inaccurate placement of the reflective film among others, thereby improving display quality.

The display device made in accordance with any of the foregoing embodiments of the present disclosure may be used with a touch panel to form a touch display. Furthermore, the display device or touch display device made in accordance with any of the foregoing embodiments of the present disclosure may be applied to any electronic devices known in the art that use a display screen to display images, such as displays, mobile phones, notebooks, video cameras, still cameras, music displays, mobile navigators, TV sets and so on.

The present disclosure has been described with reference to the preferred embodiments and it is understood that the embodiments are not intended to limit the scope of the present disclosure. Moreover, as the contents disclosed herein should be readily understood and can be implemented by a person skilled in the art, all equivalent changes or modifications which do not depart from the concept of the present disclosure should be encompassed by the appended claims.

What is claimed is:

1. A backlight module, comprising:
   an optical assembly comprising a base film, a first conductive layer, and a first reflective layer, wherein the first conductive layer is disposed on the base film, the first reflective layer is disposed on the first conductive layer, the first reflective layer includes a first part and a second part, and the first part is connected to the second part;
   a plurality of first light units disposed on the first part and extending through the first part to be electrically connected to the first conductive layer; and
   a light guide plate disposed on the second part;
   wherein the first conductive layer comprises a circuit part and a patterned part, the circuit part is corresponding to the first part, and the patterned part is corresponding to the second part, the circuit part and the plurality of first light units are electrically connected to each other, and the patterned part has a mesh structure.

2. The backlight module of claim 1, wherein the optical assembly further comprises an adhesive layer disposed between the first conductive layer and the first reflective layer.

3. The backlight module of claim 1, wherein the first reflective layer is coated on the first conductive layer.

4. The backlight module of claim 1, wherein the base film has a thickness in a range between 5 μm and 30 μm.

5. The backlight module of claim 1, wherein the plurality of first light units are arranged along a first direction, and the first part has a first width in a second direction perpendicular to the first direction, the second part has a second width in the second direction perpendicular to the first direction, and a ratio of the first width to the second width is in a range between 0.014 and 0.083.

6. The backlight module of claim 1, wherein the optical assembly has a reflectivity in a range between 20% and 99.99%.

7. The backlight module of claim 1, wherein the first conductive layer has a thickness in a range between 1 μm and 30 μm.

8. The backlight module of claim 1, further comprising a plurality of second light units, wherein the first reflective layer further comprises a third part, the second part is located between the first part and the third part, and the plurality of second light units extend through the third part to be electrically connected to the first conductive layer.

9. A display device, comprising:
   a display panel; and
   a backlight module disposed correspondingly to the display panel and comprising:
      an optical assembly comprising a base film, a first conductive layer, and a first reflective layer, wherein the first conductive layer is disposed on the base film, the first reflective layer is disposed on the first conductive layer, the first reflective layer includes a first part and a second part, and the first part is connected to the second part;
      a plurality of first light units disposed on the first part and extending through the first part to be electrically connected to the first conductive layer; and
      a light guide plate disposed on the second part;
   wherein the first conductive layer comprises a circuit part and a patterned part, the circuit part is corresponding to the first part, and the patterned part is corresponding to the second part, the circuit part and the plurality of first light units are electrically connected to each other, and the patterned part has a mesh structure.

10. The display device of claim 9, wherein the optical assembly further comprises an adhesive layer disposed between the first conductive layer and the first reflective layer.

11. The display device of claim 9, wherein the first reflective layer is coated on the first conductive layer.

12. The display device of claim 9, wherein the base film has a thickness in a range between 5 μm and 30 μm.

13. The display device of claim 9, wherein the plurality of first light units are arranged along a first direction, and the first part has a first width in a second direction perpendicular to the first direction, the second part has a second width in the second direction perpendicular to the first direction, and a ratio of the first width to the second width is in a range between 0.014 and 0.083.

14. The display device of claim 9, wherein the optical assembly has a reflectivity in a range between 20% and 99.99%.

15. The display device of claim 9, wherein the first conductive layer has a thickness in a range between 1 μm and 30 μm.

16. The display device of claim 9, further comprising a plurality of second light units, wherein the first reflective layer further comprises a third part, the second part is located between the first part and the third part, and the plurality of second light units extend through the third part to be electrically connected to the first conductive layer.

* * * * *